United States Patent [19]

Benton et al.

[11] Patent Number: 5,611,059

[45] Date of Patent: Mar. 11, 1997

[54] PRELINKED PARAMETER CONFIGURATION, AUTOMATIC GRAPHICAL LINKING, AND DISTRIBUTED DATABASE CONFIGURATION FOR DEVICES WITHIN AN AUTOMATED MONITORING/CONTROL SYSTEM

[75] Inventors: Allen D. Benton, Dublin; Leon J. Hochstedler, Worthington; Kevin A. Hughes; Paul H. Knapke, both of Columbus; Michael J. Monteiro, Westerville; Christopher J. Protopapas, Columbus; Fred Van Eijk; Frank J. Donnelly, both of Dublin; A. Donald Hale, Jr.; Keith E. Sarbaugh, both of Hilliard; Winthrop G. Worcester, Powell, all of Ohio

[73] Assignee: Square D Company, Palatine, Ill.

[21] Appl. No.: 300,419

[22] Filed: Sep. 2, 1994

[51] Int. Cl.⁶ .................................................. G06F 3/00
[52] U.S. Cl. .......................... 395/326; 395/348; 395/349; 395/965; 364/500; 364/146; 364/188
[58] Field of Search ................................. 395/155, 159, 395/161; 364/221.9; 422/62

[56] References Cited

U.S. PATENT DOCUMENTS

| | | | |
|---|---|---|---|
| 5,226,118 | 7/1993 | Baker et al. | 395/161 |
| 5,291,587 | 3/1994 | Kodosky et al. | 395/157 |
| 5,295,242 | 3/1994 | Mashruwala et al. | 395/159 |
| 5,408,603 | 4/1995 | Van De Labior et al. | 395/161 |

*Primary Examiner*—Raymond J. Bayerl
*Assistant Examiner*—A. Katbab
*Attorney, Agent, or Firm*—Michael J. Femal; Richard J. Graefe; Larry I. Golden

[57] ABSTRACT

A user interface for a control structure comprising a controller, and physical devices coupled to the controller is disclosed. The controller is adapted to control and monitor the physical devices. The user interface is coupled to the controller for displaying representations of status conditions of the physical device. The user interface comprises a system database adapted to include the representation of the physical device, means for creating the system database within the user interface, a set of points to be used within the system database, the points being adapted to represent the physical devices and adapted to be accessible from the system database, and a set of pointgroups within the system database, adapted to represent multi-parameter physical devices and adapted for accessibility from the system database, each pointgroup having at least one point linked to the pointgroup, and each point within a pointgroup representing one of the physical parameters of the physical device, the means for creating the system database including means for creating the representations, the creating means using the pointgroups to create the system database and the pointgroups allowing a user to decrease the amount of time spent on creating points for the physical devices.

7 Claims, 6 Drawing Sheets

PRELINKED PARAMETER CONFIGURATION, AUTOMATIC GRAPHICAL LINKING, AND DISTRIBUTED DATABASE CONFIGURATION FOR DEVICES WITHIN AN AUTOMATED MONITORING/CONTROL SYSTEM

DESCRIPTION

1. Technical Field

The present invention relates generally to an industrial automation system including software that is used to collect data, to monitor devices within an industrial environment, to trend characteristics of devices within an industrial environment, and to graphically interface between a user and an industrial environment for monitoring and/or controlling the industrial environment or control structure. More specifically, the present invention relates to a system which allows a user to create software representations of actual devices, including but not limited to process equipment within an industrial environment/control structure that have prelinked parameters that relate the representation to the created device.

2. Background Prior Art

In mechanical, electrical, and chemical processing systems and structures, overall control structure monitoring and/or control has been a goal for many years. With the advent and progress of personal computers (PCs), the automation industry has begun to move toward the use of these more capable and less expensive PCs rather than relying on main frame and mini-computers to perform monitoring and/or control. The newer generation of PCs also allows software product manufacturers to create easier to use products for less advanced users of PCs through use of interfaces to the operating system (such as Windows™) and interfaces for the specific application software packages which many software products now provide to the users.

There are currently several control and monitoring automation packages which allow a user, or users, at different locations on a network, to monitor and/or control structures which can include manufacturing control structures, heating ventilation and air conditioning (HVAC) control structures, security control structures, fire alarm control structures, and even fire control structures to name only a few. Within the automation software packages which control these control structures, points are created that represent physical devices within the different types of control structures. The physical devices, are coupled together through electrical and/or optical networks and the networks are interfaced with the PCs.

More specifically, the physical apparatus (manufacturing apparatus or HVAC apparatus) that is being controlled will have physical control and monitoring devices that are physically coupled to a network. The PC or central automation device which is running the control and monitoring software is also coupled to the network. Some control and monitoring software packages allow for one PC to handle multiple networks. The types of networks used vary depending on the network protocols and overall strategy of design being implemented by the designers. Newer operating systems are currently being implemented which not only allow for multiple network connections to one PC, but also allow for multi-tasking of the separate networks simultaneous with one another. Further capabilities include having several PCs on a network (likely at different locations in a control environment) to again facilitate the needs of the physical layout within a control structure.

Returning to the previously mentioned points, these points are usually set up to represent the type of physical device that actually exists in the control environment. For example, a digital point can be set up to represent an on/off type physical device and an analog point can be set up to represent a numerical type device (i.e., temperature or pressure values). Some networks give each of the physical devices an address value in order for the physical device to be located on the network by the control and/or monitoring automation system. However this coupling is performed (either at the controller or at the PC through a dialogue entry screen), the point that is representative of a physical device must be coupled to the actual physical device within the control structure. Thus, the point that is created for each physical device in the control structure represents the device within the software and the software can monitor and control the physical device based on the point (point name) created for the physical device. The user usually sets up the point names for the physical devices such that the point name represents a meaningful identification of the physical device.

Once the points are set up for the physical devices, previous control and monitoring systems provided software capabilities to interface the points within graphical representations of the control structure which the user must set up. With respect to the graphics, the user can select or create objects which are representative of the type of physical devices which exist within the control structure. For example, a user could create an on/off switch from graphical symbols placed into the software by the designers in order for the user to create a graphical switch for monitoring and/or controlling the physical switch within the control structure.

Some larger or more complicated physical devices within a control structure have several analog and/or digital values or states which represent different physical parameters of the overall physical device. Previous monitoring and control software designs required that a separate point manually be created for each physical parameter of a physical device when the physical device had several values and/or states associated with the physical device. The graphical representations created for the different physical devices within a graphic also needed to represent the different values or states of the physical devices along with the individual physical parameters associated with the physical devices that had several values and/or states associated with the physical device. Therefore, before the current invention, users were required to manually link or couple the points created for each physical device and each physical parameter of each physical device to the graphical symbols created for each physical device and the graphical symbols created for each physical parameter (logical parameter) of each physical device, respectively.

Although graphics screens were created that allowed a user to monitor and/or control the numerous points by name, the graphical interfaces provided the most user friendly way to monitor and control the points created for the physical devices. However, in order to monitor and control the physical devices, a user or operator was required to set up the numerous points (several may be required for each physical device) and the numerous graphical representations for each point and physical device as previously mentioned. Thus, setup within the automation system (the dialogue screens) for large control structures could take hundreds of hours to perform.

At least one control/monitoring software provider has previously acknowledged the great amount of time required to setup the points, graphics, and the linking or coupling of the points to the graphical symbols within the system database. This software provider has attempted to address this problem by creating built-in logical parameters for graphical symbols so that the user did not have to create the logical parameters for each graphical symbol to more easily proceed in entering the requisite linking information. This previous design would then prompt the user to link each logical parameter to a point representing the actual physical parameter of the physical device. More specifically, the software designers, knowing that some devices have several physical parameters associated with the physical device, included the physical device parameters within the graphical symbols that represent the physical device. The representations of the physical parameters are the logical parameters. Thus, when a graphical symbol is created for the physical device, a user did not have to create all of the logical parameters within the graphical symbol. Thus, time is saved in creating the logical parameters, but not in the remaining linking or coupling steps.

Hence, the user would then have to link or couple each individual parameter to a point created for the actual physical parameter within the physical device. Thus, the user did not save any time in creating the links between the points and the pre-entered logical parameters within graphical symbols. The user must still actually enter these items into the PC or other control/monitoring apparatus (user interface).

Furthermore, prior art run-time (real-time) database designs have been created using a global memory technique. Specifically, all of the points, and other dynamic database information, remain together during operation of the application control software. Real-time global databases are less reliable and have less protection barriers than the present invention and, therefore, are more susceptible to corruption and security violations. The present invention is provided to solve these and other problems.

SUMMARY OF THE INVENTION

The present invention allows a user to save a great amount of time in creating a control/monitoring (application) database with respect to the creation of the points for each physical device, to the creation of the graphics for the particular type of control structure being monitored/controlled, and creation of the links between the points and the graphical symbols that represent the physical devices within the control structure. The invention automatically creates the required individual points for the physical parameters of a physical device that has several physical parameters associated with the physical device (multi-parameter physical devices have pointgroup names as well as point names for the individual physical parameters within the multiparameter physical devices). In addition, when graphical symbols are created for the physical devices within the control structure, the physical parameters of physical devices are automatically linked or coupled to the logical parameters (points) of the graphical symbol when the pointgroup name is linked to the graphical symbol.

Thus, the present invention is an automated control/monitoring system which has the capability of controlling and/or monitoring physical devices within the control structure. The system includes the ability to configure and define the system database, and thus, the application databases, as well as the ability to communicate with the physical devices. The automation system includes a system database (which includes an application database) for the physical devices within the control structure, an automation control/monitoring user interface, means for networking the physical devices to the control/monitoring user interface, a premade set of points, designated as point templates, that are adapted to represent the physical devices within the control structure, and a premade set of pointgroups, designated as pointgroup templates, that are adapted to represent multi-parameter physical devices. Each point within a point-group is automatically linked or coupled to the physical device and represents one of the physical parameters of the multi-parameter physical device. The system also includes means for creating the system database, and, thus, for creating the application database, through the use of pointgroup templates to create pointgroups, the pointgroups being, generally, points that represent multi-parameter physical devices. The pointgroup templates allow a user to decrease the amount of time spent on creating points for the physical devices through the creation of the pointgroups with the use of the pointgroup templates. Thus, the point-group templates act as a type of virtual cookie cutter to stamp out pointgroups for the type of multi-parameter device within the control structure. Besides the pointgroup templates for ease of creation of the pointgroups, point templates also exist as an option for the user to create points from the user interface (MCUI). Again, the user can use the premade set of point templates to "stamp out" new points in a cookie cutter fashion. Custom point templates can be also be created in order to more easily create many points of the same custom type. As an alternative, the user can always manually create a point from scratch without the ease of the premade set of default options which are provided by a point template.

Furthermore, the system also includes a premade set of graphical symbols that are adapted to represent the physical devices within the control structure, the system being capable of using the premade set of graphical symbols to create graphics to control/monitor the physical devices in which the graphical symbols for the multi-parameter physical devices are automatically linked to the points within the pointgroup upon selection of a symbol from those available to the pointgroup.

The present invention also includes a distributed real-time database configuration which enhances reliability of the data and security between the distributed databases. Specifically, the non-real-time database (before the information in the database enters into random access memory or RAM) can be located at one node in a network of PCs (user interface). At run-time, based on the distributed configuration of the database, the information within the database separates into serial/network groupings. The individual groupings of information are grouped according to where the points and other information are actually physically located within the control structure. The information groupings are accessed by the PC (user interface) as the groupings are defined within the control structure. Thus, the serial/network grouping of information will then reside in the RAM of the PC (user interface) which includes the serial/network connection for the points and other information that represents the physical devices on that serial/network connection.

Furthermore, the present invention also includes a mechanism to automatically organize the actual communications to the physical devices into optimized transactions, with no additional input from the user. This organization is based on the point definitions within the application database.

Other features and advantages of the invention will be apparent from the following specification taken in conjunction with the following drawings.

DETAILED DESCRIPTION

Figure 1:
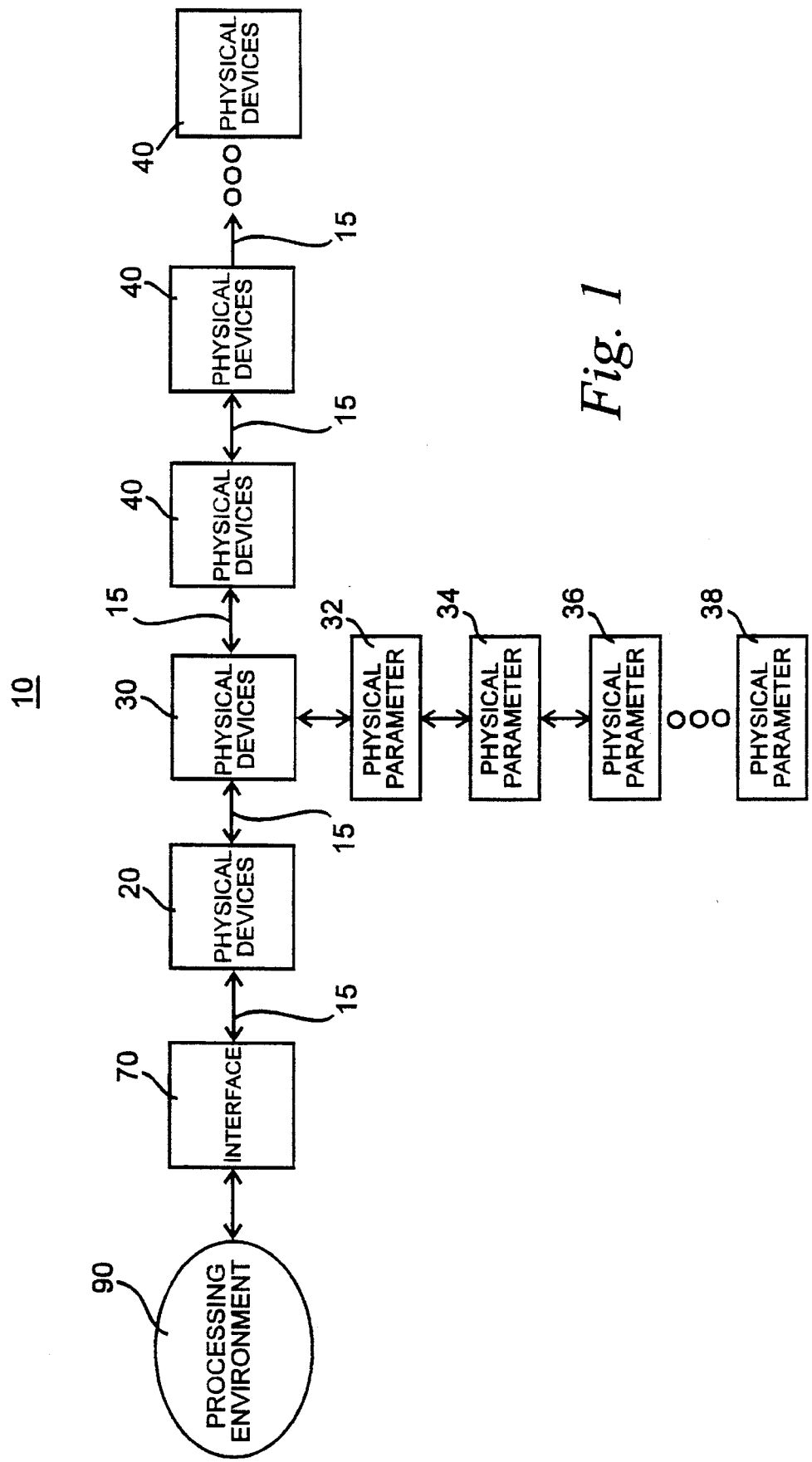
FIG. 1 is a layout block diagram of a physical device network showing physical devices being coupled to a processing environment/control structure.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

The present invention is currently incorporated with Square D Corporation's Streamline™ automation software product. The Streamline™ automation software product can be run with the Network version of Microsoft® Windows™ (WindowsNT™ version 3.1 with Service Pack 2). The PC based Streamline™ automation product should be installed into a 486, or higher microprocessor based PC (Monitoring/Control User Interface—MCUI 300, FIG. 2). Preferably, the PC 300 should have at least 16 Megabytes (Meg) of Random Access Memory (RAM), and have a processor speed of at least 50 MHz. WindowsNT™ requires over 70 Megabytes of hard disk storage 400 (FIG. 3). Other capabilities and requirements of the networking (see FIG. 2) as well as internal features of the MCUI 300 are well known to one of ordinary skill in the art upon installation. It should be understood that as an alternative to the use of PCs for the MCUI 300 within the processing environment network 90, other types of MCUIs 300 could be used. For example, the DIGITAL® Alpha™ 300 product could be used along with the compatible version of WindowsNT™ to replace the PC 300 as the hardware and operating environment of the MCUI 300.

The Streamline™ automation software product, in its current configuration, is designed to run within the WindowsNT™ environment. The Streamline™ automation software product was also created using an object-oriented methodology and this methodology creates the appropriate setting for the current invention. In addition, the designers of the Streamline™ automation product and the current invention used C++ as the preferable programming language. However, depending on the programming restraints, other languages or platforms could be used as long as the object-oriented features of the present invention, which follow, are achieved.

Figure 4:
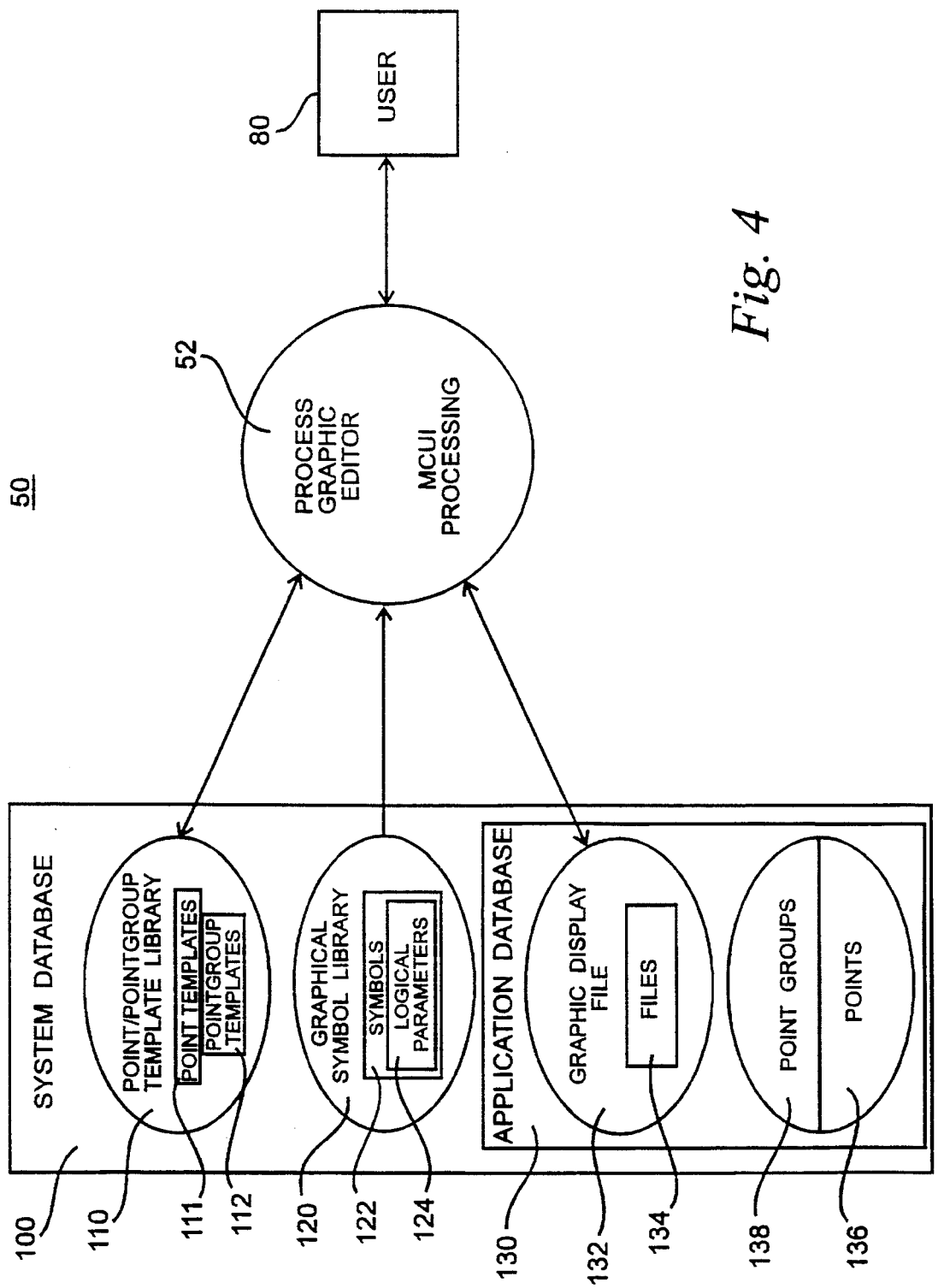
FIG. 4 is a specific block diagram of relevant portions of the monitoring/control user interface hardware device with the process graphic editor in use.
Figure 5:
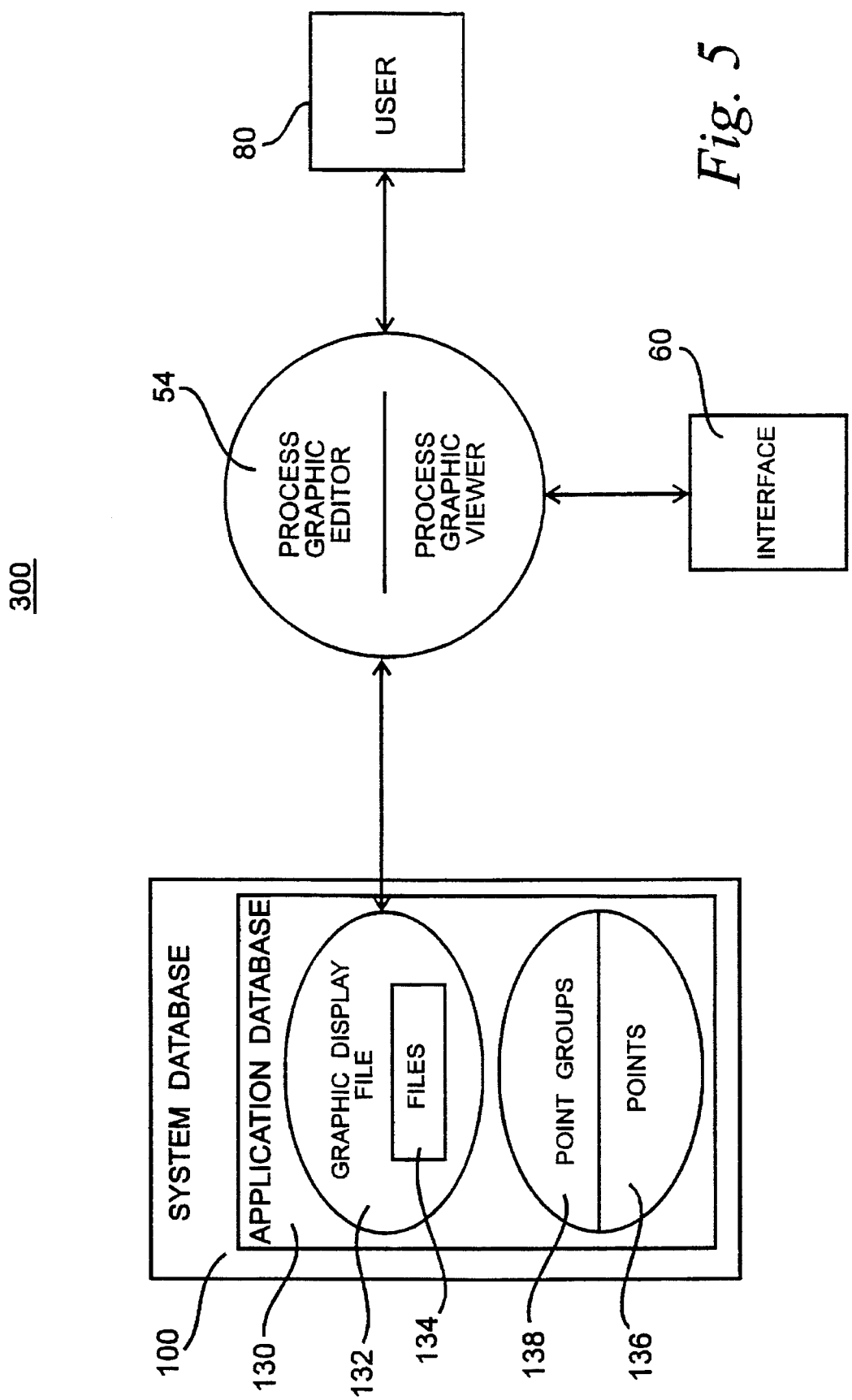
FIG. 5 is a specific block diagram of relevant portions of the monitoring/control user interface hardware device with the process graphic viewer in use.

Now turning to the overall invention, the present invention is an automated control/monitoring system for controlling and/or monitoring physical devices 20, 30, 40 within the control structure. Examples of automation systems for control structures include manufacturing systems, heating ventilation and air conditioning (HVAC) systems, security systems, fire alarm systems, and even fire control systems to name only a few. Each system has a system database 100 for that system. Some systems break down the overall system database into functional or location/plant dependent databases which some of ordinary skill in art call application databases 130 (FIGS. 4 and 5). For example, one manufacturing plant may have several buildings within a plant. A separate application 130 database can be created for each building within the plant. The application database 130 usually includes the specific points and related information for that particular application. The rest of the system database 100 can include libraries or generic information for use in the creation of the applications or the rest of the system. The software can be designed to allow a user this capability as is commonly known to one of ordinary skill in the art.

Figure 2:
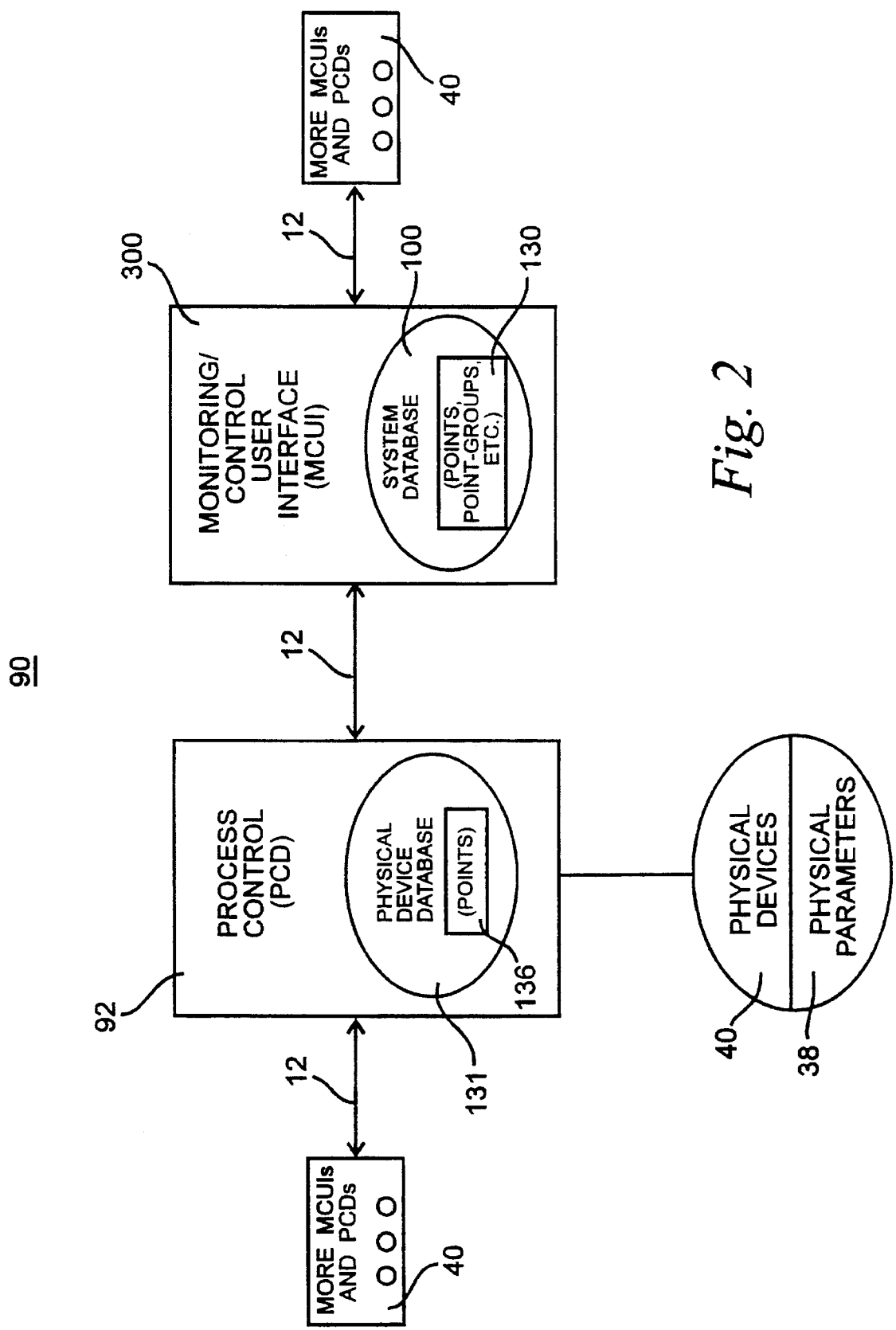
FIG. 2 is a block diagram of the processing environment network showing the interconnectivity of control structure and hardware features with the automation system.
Figure 3:
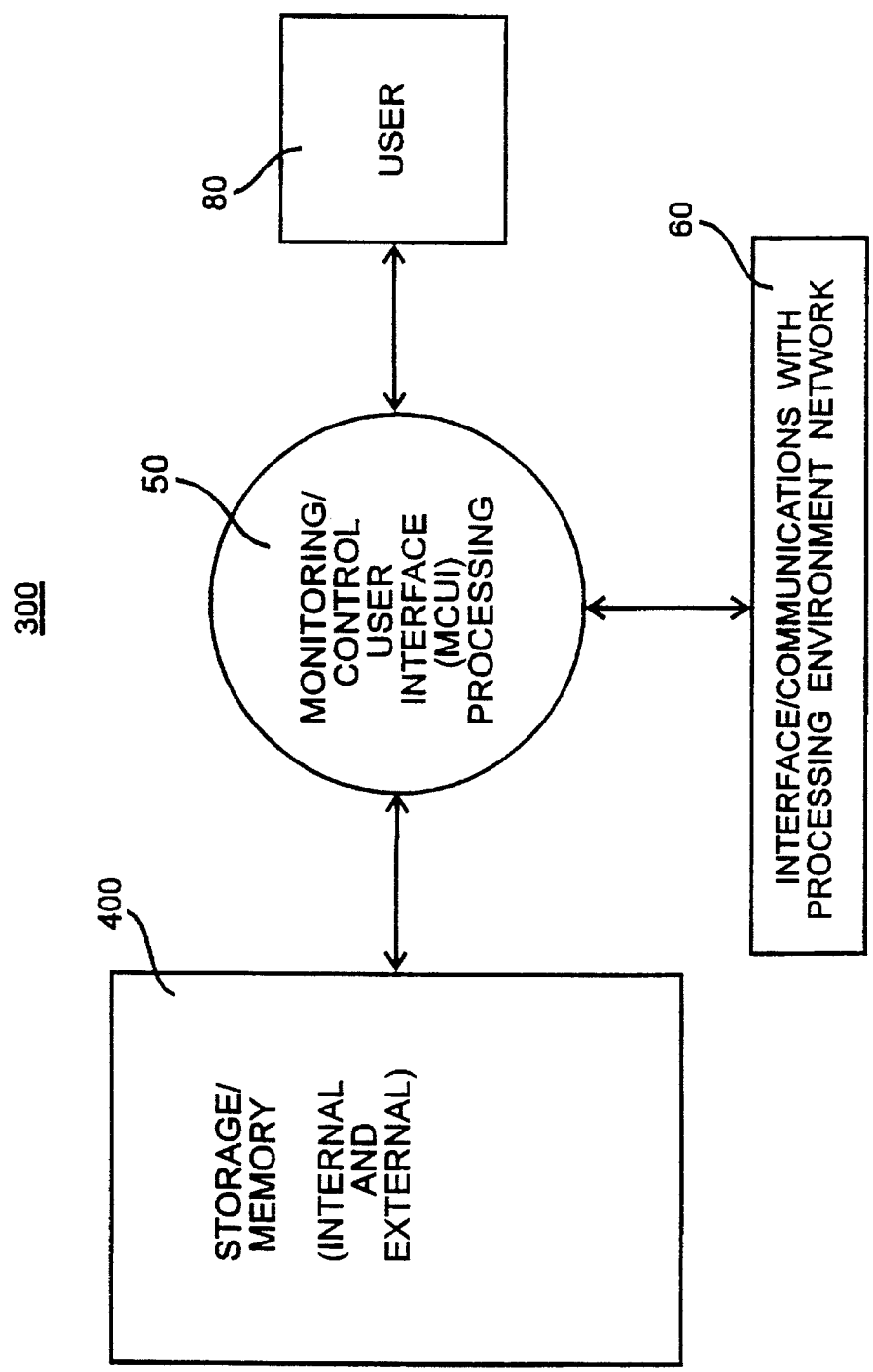
FIG. 3 is a generic block diagram of relevant portions of a monitoring/control user interface hardware device.

Thus, turning to FIG. 1, FIG. 2, and FIG. 4, together, the user needs to create an application database 130 (FIG. 4) within the MCUI 300 (FIG. 2) in order to include the physical devices 20, 30, 40 (FIG. 1) within the application database 130 (FIG. 4). Turning only to FIG. 1, the physical devices 20, 30, 40 can be coupled together through a physical device network 15. If the network 10 is used, the physical devices 20, 30, 40 would need physical addresses to differentiate the physical devices 20, 30, 40 from one another. This type of network is commonly known in the art. Alternatively, the physical devices 20, 30, 40 can be directly coupled to a process control device (PCD or controller) 92 within the processing environment 90. When the physical devices 20, 30, 40 are directly attached to a PCD 92, the interface 70 acts as the interface between the controller (not shown) within the PCD 92 and the physical devices 20, 30, 40. Other methods of physical addressing and communication between the PCD 92 and the physical devices 20, 30, 40 can be used, as are well known in the art.

As depicted in FIG. 1, physical device 20 does not have any physical parameters associated with it. However, physical device 30 has several physical parameters 32, 34, 36, 38 associated with it. The difference between the two is inherent within differences between the actual types of physical devices 20, 30, 40 that are coupled to the PCDs 92. For example, physical device 20 could represent a digital switch, while physical device 30 could represent a mixing tank in a manufacturing process. A mixing tank is well known in the art to have several physical parameters 32, 34, 36, 38 associated with it. In particular, a mixing tank usually has a level parameter, an analog mixing control parameter, a digital mixing control parameter, a pressure parameter, a speed parameter, and a temperature parameter. Thus, the physical parameters 32, 34, 36, 38 associated with the physical device 30 are inherent to the type of physical device 30 in the control structure. Physical devices with more than physical parameter 32 can be called multi-parameter physical devices 30. In the example above, the physical device 20 does not need physical parameters 32, 34, 36, 38 based on the inherent simplicity of a switch. Although the physical parameters 32, 34, 36, 38 are depicted as being first coupled to the physical device 30 in FIG. 1, in practice, the parameters act in the same fashion as physical devices 20, 30, 40. Thus, the physical parameters 32, 34, 36, 38 are coupled to PCD 92 in the same fashion as the physical devices 20, 30, 40, as is well known in the art.

FIG. 2 generally represents the processing environment 90 and can include different types of monitoring/control interfaces and devices which are networked together by network coupling devices 12. One type of control device is a process control device (PCD) or controller 92 which includes a physical device database 131. Within the physical device database 131, points 136 for use within the application database 130 can be created which represent the physical devices 40 as well as the physical parameters 38. The PCD 92 controls and monitors the physical devices 40 and physical parameters 38 and thereby controls the portion of the control structure which is coupled to the particular PCD 92. One PCD 92 can also be programmed to control points 136 which exist in other PCDs as well.

The monitoring/control user interface (MCUI) 300 allows a user to monitor and, if the user has the appropriate security level within the software and the points 136 are controllable, control the physical devices 40 and physical parameters 38 through the processing environment network 90. The MCUI is similar to a Man Machine Interface (MMI) that is well known in the art. However, the MCUI has the additional features that are described within this specification. The MCUI 300 is networked to the PCDs 92 through a network connection 12, as is well known in the art. This network connection 12 allows the MCUI 300 to communicate with the points 136 which exist in the PCD 92. In order for the MCUI 300 to communicate with the points 136 within the physical device databases 131 of the PCDs 92, the MCUI 300 has its own application database 130 that is a part of the system database 100. The points 136 within PCDs are duplicated within the MCUI 300 application database 130. Several PCDs 92 can exist on a network 90, and several MCUIs 300 can also exist on a network 90 as well.

FIG. 3 depicts a MCUI 300 in basic block diagrammatical form. The MCUI 300 includes a user portion 80 which otherwise represents a monitor and keyboard for performing user functions. The MCUI 300 also has a processing portion 50 and storage/memory portion 400. The processing portion 50 represents the actual processing being performed by the microprocessor or other processing hardware within the MCUI 300. The storage/memory portion 400 can be used to store the system database 100 as well as the application databases 130, programs, libraries, and other information which the MCUI 300 requires to operate. The processor 50 can pull information out of the storage/memory portion 400 and also put information into the storage/memory portion 400. The MCUI 300 additionally includes an interface/communications portion 60 which is used to interface the MCUI 300 with the processing environment network 90. The interface/communicator 60 is coupled to the network 90 through the network connector 12. The interface/communicator 60 allows the processor portion 50 and user 80 to communicate with the PCDs 92 by means of information stored within the storage/memory portion 400.

FIG. 4 represents the same general elements of FIG. 3 and further represents process graphic editing within an MCUI 300 for creating and modifying the system and application databases 100, 130, respectively. The user 80 can direct the processor portion 50 in FIG. 2 to pull the process graphic editor software into the processor 50 for use by the user 80. Thus, FIG. 4 represents the processor 50 with the process graphic editor 52 running. The process graphic editor 52 allows the user 80 to create, modify, and delete graphic display files 134. When the graphic display editor 52 is running, information within the system and application database 100, 130 can be accessed and changed. This information includes the point/ pointgroup template library 110, the graphical symbol library 120, and the graphic display file 132. The point/pointgroup template library 110 (FIG. 4) includes a premade set of point templates 111 and pointgroup templates 112 to which new point templates 111 and pointgroup templates 112 can be added, and existing point and pointgroup templates 111, 112 can be partially modified and deleted.

Returning to FIG. 2 and also referencing FIG. 4, points 136 are created by the user, either through the use of the point templates 111 or through manual creation, for each physical device 40 and physical parameter 38. The point and pointgroup templates 111, 112 contain default information (such as device memory address, scaling parameters, and alarm thresholds, to name only a few) for the particular type of point 136 or pointgroup 138 which the user desires to create. Points 136 can be created for the physical parameters 32, 34, 36, 38 of multi-parameter physical devices 30 without individually entering a point 136 for each physical parameter 32, 34, 36, 38. Instead, a point/pointgroup template library 110 (FIG. 4) exists for commonly used multi-parameter physical devices 30 so that a user does not have to individually create points 136 for each physical parameter 32, 34, 36, 38. When the user enters points 136 for a multi-parameter physical device 30, the user only needs to select the correct pointgroup template 112 for the multi-parameter physical device 30 and points 136 will automatically be created for each physical parameter 32, 34, 36 ◘, 38. Thus, the point 136 and pointgroups 138 can each be created through a template which can be chosen to create the point 136 or pointgroup 138. The point template 111 can be chosen from a point dialogue screen (not shown) when a point 136 is being created, and a pointgroup template can be chosen from a pointgroup dialogue screen (not shown) when a pointgroup is being created. The point 136 or pointgroup 138 will automatically be created with the use of the templates 111, 112, and the requisite information to define the point 136 or pointgroup 138 will be initialized with the default values from the template without manual entry of those defaults by the user. The user then need only customize each point 136, as needed, to specify the unique attributes of those points 136, such as device memory address, scaling parameters, and alarm thresholds, to name only a few, as is well known in the art. Thus, each point 136 can be created from a point template 111 to define or modify the definition of the point 136, and each pointgroup 138 is created from pointgroup template 112 to define or modify the definition of the pointgroup 138. FIG. 4 represents the point templates 111, and pointgroup templates 112. Pointgroup templates 112 are the premade, modified, or created set of pointgroups which exist within the point/pointgroup template library 110, and pointgroups 138 are the pointgroups which are actually created from the pointgroup templates 112 and that are being used for applications within the application databases 130. Likewise, point templates 111 are the premade, modified, or created set of points which exist within the pointgroup library 110, and points 136 are the points which are actually created from the point templates 111, or manually from scratch, and that are being used for applications within the application databases 130.

A set of points 136 exist for each pointgroup 138 to be used within the system and application databases 100, 130, the pointgroup 138 automatically being created from a point group template 112. Again, the points 136 are designed and adapted to represent the physical devices 40 and physical parameters 38 and can be accessed from the system database 100 (application databases 130, FIGS. 4 and 5). In addition, the premade set of pointgroup templates 112 contain coupling or linking information and this coupling information is used to couple or link the appropriate points 136 to the particular pointgroup 138 upon creation of the pointgroup 138, the pointgroup 138 being used within the system and application databases 100, 130. The pointgroups 138 and pointgroup templates 112 are designed and adapted to represent the multi-parameter physical devices 30 and can be accessed from the system database 100. Returning to FIG. 4, the point/pointgroup template library 110 is the premade set of point templates 111, and pointgroup templates-112, the pointgroup templates having the appropriate linking or coupling information for coupling or linking to points 136. It should be understood that points 136 can be created from scratch through the point dialogue screen. It should also be understood that point templates 111, and pointgroup templates 112 can both be created from scratch in order to use at a later time to create points 136 and pointgroups 138, respectively. Thus, the points 136 and pointgroups 138, as well as the premade sets of point templates 111 and pointgroup templates 112, can be created, modified, and deleted according to the requirements of the specific application of the control structure. Another feature of the pointgroup template 112 defines how the pointgroup 138 can be represented graphically. To this end, the pointgroup template 112 also contains coupling/linking information for coupling/linking graphical symbols 122 to the pointgroup 138, and the graphical symbols 122 being viewable from an available list of graphical symbols. The list of graphical symbols is automatically limited to the types of graphical symbols that are appropriate for that particular pointgroup 138 type.

The graphical symbol library 120 is the location within the system database 100, and comprises a premade set of graphical symbols 122 of displayable representations usually of what the actual physical devices 40 look like in the control structure. A user can select graphical symbols 122 from the graphical symbol library 122 in order to create or modify graphic display files 134. Graphical symbols 122 which are representations of multi-parameter physical devices 30 have premade sets of logical parameters 124 associated with these types of graphical symbols 122. When the user 80 wants to create or modify a graphic file 134, the user instructs the process graphic editor 52 to open a new graphic file 134 or open an existing graphic file 134 which is stored within the graphic display file 132. If a user wants to create a graphical symbol 122 within the graphic file 134, the user 80 instructs the process graphic editor 52 to select a graphic symbol 122 from the graphical symbol library 120 and place it into the graphic file 134. When a user 80 creates a graphical symbol 122 of a multi-parameter physical device 30, the premade set of logical parameters 124 associated with the symbol 122 also now exist within the graphic file 134, and are associated to the symbol 122 within the graphical file 134. The user is not finished, however, because the symbol 122 and its logical parameters 124 have to be linked to the points 136 which represent the physical devices 40, and physical parameters 38 within the control structure.

For a symbol 122 which does not have any logical or physical parameters 124, 38 associated with it, only the point 136 needs to be linked to the symbol 122. However, for symbols 122 which represent multi-parameter physical devices 30, the pointgroup 138 points 136 must be linked to the logical parameters 124 which are automatically associated with the symbol 122. Based on the aforementioned association of available graphical symbols with pointgroup templates 112, and the prelinking of the points 136 to the pointgroup templates 112, and thus pointgroups 138, and the premade association between the logical parameters 124 and the symbols 122 for multi-parameter physical devices 30, the user 80 need only link the symbol 122 to the pointgroup 138. As one of the several ways to link the symbol 122 to the pointgroup 138, the user 80 need only pull up a pointgroup coupling/linking dialogue box (not shown), and select the specific pointgroup 138 the user wishes to couple/link. For this particular pointgroup 138, the user selects a graphical symbol 122 from a predetermined, and modifiable, set of graphical symbols 122 which are related to the type of pointgroup 138 being linked. These graphical symbols are presented to the user on the pointgroup coupling/linking dialogue box (not shown). In order to prevent the user from selecting an incorrect graphical symbol 122 for a particular type of pointgroup 138 no symbols 122 will appear in the pointgroup coupling/linking dialogue box that do not relate to the type of pointgroup 138 being linked to the graphical symbol 122. When the user 80 selects the graphical symbol 122 from the pointgroup coupling/linking dialogue box, which includes the available graphical symbols for the particular pointgroup 138, the logical parameters 124 of the symbol 122 are automatically linked to the proper and correct points 136 within the pointgroup 138. Thus, by selecting a graphical symbol 122 from the pointgroup coupling/linking dialogue box and placing the symbol 122 on the graphical display 134, the present invention automatically links or couples each and every logical parameter 124 of the symbol 122 to the appropriate point 136 (physical device 40 or physical parameter 38) within the selected pointgroup 138. Hence, the user saves a great deal of time based on the process graphic editor 52 automatically linking the points 136 within the pointgroups 138 to the logical parameters 124 within the graphical symbol 122 created. Once the user 80 has completed modifying and/or creating a graphical file 134, the user 80 can instruct the process graphic editor 52 to save and store the file 134 within the graphic display file 132. It should be understood that the symbols 122 can be created from scratch through the process graphic editor 52 in conjunction with drawing utilities (not shown). These symbols 122, as well as the premade set of symbols 122 in the graphical symbol library 120 can also be modified and deleted according to the requirements of the specific application of the control structure.

FIG. 5 again represents the same general elements of FIG. 3 and further represents process graphic viewing within a MCUI 300 for viewing and/or controlling the application database 130 from the graphical files 134. The user 80 can direct the processor portion 50 in FIG. 3 to pull the process graphic viewer software into the processor 50 for use by the user 80 (selecting a graphic). Thus, FIG. 5 represents the processor 50 with the process graphic viewer 54 running. The process graphic viewer 54 allows the user 80 to select a graphic display file 134, view the portion of the control structure that is represented in the graphic file 134 within the system and application databases 100, 130, and view and/or control that portion of the control structure. When the user 80 selects a graphical file 134, the process graphic viewer 54 automatically updates the values and states of the symbols 122 and logical parameters 124 to the values and states of the actual physical devices 40 and physical parameters 38 out in the control structure, in a real-time configuration. As long as the graphic file 134 remains pulled up in front of the user 80, the process graphic viewer 54 will continuously update the values and states (in real-time). When a graphical file 134 is selected, the portion of the application database 130 which is being referenced by the process graphic viewer 54 is being referenced in a read only mode. The read-only mode only allows the process graphic viewer 54 to read information from the application database 130. The read-only mode does not allow the process graphic viewer 54 to write (create or modify) information to the application database 130.

Figure 6:
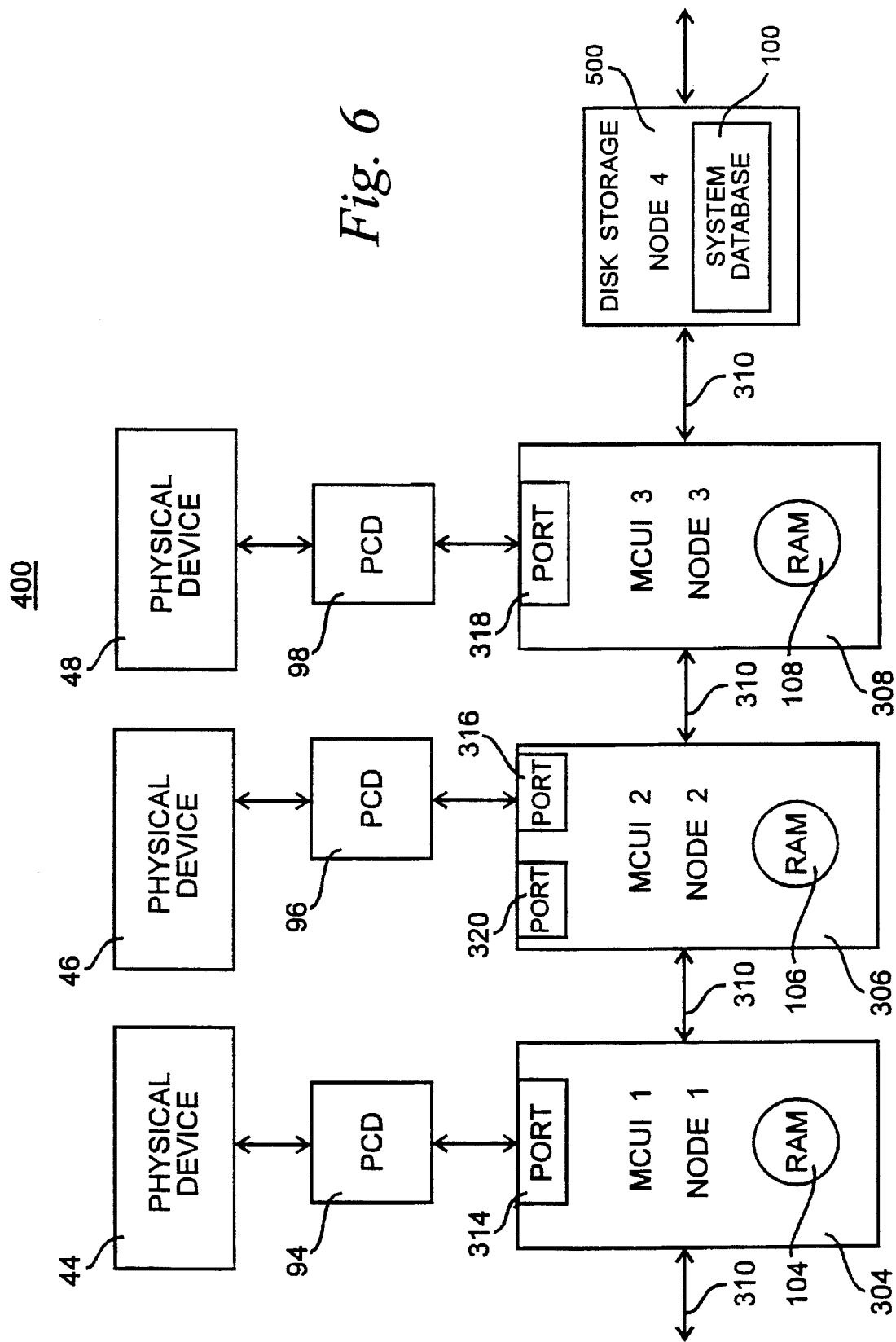
FIG. 6 is a physical hardware layout of one possible configuration of the system and control structure and presents an appropriate setting to explain the distributed real-time database configuration.

Turning additionally to FIG. 6, the MCUIs 304, 306, 308 (300 in other figures) have a distributed real-time database configuration 400 which enhances reliability of the data and security between the distributed run-time database configuration. FIG. 6 depicts three MCUIs 304, 306, 308 networked together by means 310 such as Ethernet as is commonly known in the art. In addition, a disk storage hardware device 500 can also exist on this same network which all of the MCUIs 304, 306, 308 can store in formation on and retrieve information from. This disk device 500 can be adapted to contain the system database 100 which includes at least the points 136, pointgroups 138, pointgroup library 110, point templates 111 and pointgroup templates 112 therein, symbols 122, logical parameters 124, graphical symbol library 120, files 134 and the graphical display file 132. The MCUIs 304, 306, 308 can then request information out of application database 130 within the disk device 500 in order to run real-time applications for monitoring and control.

The physical layout in FIG. 6 also includes PCDs 94, 96, 98 (92 in FIG. 2) which are coupled to their respective MCUIs 304, 306, 308. Each PCD 94, 96, 98 has physical devices 44, 46, 48 (40 in FIG. 1) coupled to the PCD 94, 96, 98. If the MCUIs 304, 306, 308 are PCs, the PCDs 94, 96, 98 can be connected or coupled to the serial ports of the PCs as shown in FIG. 6, or can alternatively be coupled to an Ethernet network as is commonly known in the art. The full system database 100 can also alternatively exist in any one of the MCUIs 304, 306, 308 instead of within the disk device 500.

The system and application databases 100, 130 and the MCUIs 304, 306, 308 are configured to establish the appropriate conditions for a distributed real-time database when the MCUIs 304, 306, 308 are running in a real-time fashion. Specifically, the information within the application database 130 is arranged according to node names (depicted as node numbers in FIG. 6), serial/Ethernet ports 314, 316, 318, and communication protocol type (not shown). For example, all the information which represents PCD 94 and physical devices 44 are grouped together with reference to node 1 (a name), serial/Ethernet port 314, and the type of PCD 94 communication protocol which is first entered into the application database 130 for serial/Ethernet port 314. With respect to entering the information for the PCDs 94, if a user attempts to enter information for a PCD 94 that does not have the same protocol as the PCD 94 first entered into the database for the serial/Ethernet port 314, the MCUI 304, 306, 308 will preclude the user from entering information for the non-compatible PCD 94 due to the non-compatibility with the first PCD 94 entered. Likewise for MCUI 306 and MCUI 308, the information for PCD 96 coupled to MCUI 306 and for PCD 98 coupled to MCUI 308 are referenced by node 1 (a name), serial/Ethernet port 316, and the appropriate communication protocol for PCD 96, and node 3 (a name), serial/Ethernet port 318, and the appropriate communication protocol for PCD 98, respectively.

The configuration of the real-time system programs manipulate and distribute the application database 130 in a manner that separates the information for each of the PCDs 94, 96, 98 at run-time. When an MCUI 304, 306, 308 starts up the main real-time system programs, the MCUI 304, 306, 308 will communicate with the application database 130 to retrieve information to run the system programs. The particular, MCUI 304, 306, 308 will run the particular real-time system programs and run a PCD program for each PCD attached through the particular serial/Ethernet ports of that MCUI 304, 306, 308, as well as load the particular information for the PCD 94, 96, 98 which is being accessed on the particular serial/Ethernet ports of that MCUI 304, 406, 308. In FIG. 6, the MCUI 304, 306, 308 would have to communicate through the network with the disk 500 in order to get the particular (PCD) database information. Information will be retrieved for each PCD on that particular node and will be referenced by the particular node, particular serial/network port 314, 316, 318, and particular PCD 94, 96, 98. Once the appropriate portion of the application database 130 is retrieved, the information is then placed into the random access memory (RAM) 104, 106, 108 of the MCUI 304, 306, 308, respectively, for the requesting node and the information is separated by PCD 94, 96, 98.

As an example, the real-time system programs in MCUIs 314, 316, 318 are configured such that when a user at MCUI1 304 starts up the real-time system programs, MCUI1 304 (node 1) would then communicate over the network with disk 500 and retrieve only the group(s) of information which is associated with node 1 (a name), serial/network port 314, the appropriate protocol, and the particular PCD(s) 94. A separate PCD program would start running in RAM 104 for each PCD 94 for which information exists at node 1 (a name). If a graphic display file 134 is started up through the process graphic viewer 54 at MCUI1 304 for PCD 94, MCUI1 304 would access the information for PCD 94 from RAM 104, which was originally obtained from the application database 130. Thus, the process graphic viewer 54 in MCUI1 304 would use the information associated with node 1, serial/network port 314, the appropriate protocol, and PCD 94, which exists in RAM 104, to view (in a read-only mode) the physical devices 44 coupled to PCD 94. Therefore, the configuration of the real-time system programs manipulate and distribute the system and application databases 100, 130 in a manner that separates the information for each of the PCDs 94, 96, 98 at run-time into the RAM 104, 106, 108 of the MCUI 304, 306, 308 to which each PCD 94, 96, 98 is referenced (node, serial/network port, and protocol). The information for each PCD 94, 96, 98 in loaded into RAM 104, 106, 108 of each MCUI 304, 306, 308 such that an MCUI at one node does not pull PCD information into the RAM of that node for PCDs that do not exist at that node. For example, if a graphic display file 134 is selected through the process graphic viewer 54 at MCUI1 304 for a graphic 136 that contains information for PCD 98, MCUI1 304 would have to communicate with MCUI3 308 in order to get the values of physical devices 48 coupled to PCD 48 (a symbol in the graphic 136) because the PCD 98 real-time program and all PCD 98 information would be running in RAM 108 in MCUI3 308. Hence, a true real-time distribution of the database is achieved.

With this type of configuration, modification of the network configuration is simplified. Node numbers (names) and serial/network ports 314, 316, 318 can be changed for the run-time PCD information groups in order to rearrange the overall system configuration. For example, the PCD grouping of information which represent the physical devices 44 coupled to PCD 94 can have the node number (name) and serial/network port changed from node 1, serial/network port 314 to node 2, serial/network port 320 as long as the communication protocols do not conflict. A user could then physically detach PCD 94 from serial/network port 314 and connect it to serial/network port 316. The result would be that MCUI2 306 would now run the PCD 94 distributed real-time system program in RAM 106 and would load information into RAM 106 for PCD 94 instead of MCUI1 304, running and loading the PCD 94 related programs and information. Thus, configuring the system programs to distribute the PCD information, at run-time, according to the where the points 136 and other information are actually physically located within the control structure creates a true distributed real-time, object-oriented configuration.

The present invention also includes a mechanism to automatically organize the actual communications to the physical devices into optimized transactions, with no additional input from the user. This happens based upon the point definitions 136 in the application database 130 and requires no additional input from the user. Specifically, the physical device memory addresses defined by the user for each point 136 are analyzed by the invention and organized into one or more communications transactions which obtain all the required points 136 in the most efficient way.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. For a control structure comprising a controller, and a plurality of physical device coupled to the controller, a user interface coupled to the controller, the system comprising:
   a system database adapted to include a set of graphical symbols to represent the physical devices, the representations including status conditions of the physical devices;
   means for creating the system database through the use of the user interface;
   a set of points to be used within the system database, the points being adapted to represent the physical device and adapted to be accessible from the system database;
   a set of pointgroups within the system database, adapted to represent multi-parameter physical devices and adapted for accessibility from the system database, said muti-parameter physical devices automatically being linked to the points within the pointgroups upon each pointgroup having at least one point linked to the pointgroup, and each point within a pointgroup representing one of the physical parameters of the physical device, the means for creating the system database including means for creating the representations;
   wherein the controller is adapted to control and monitor the physical device using the representations of the physical device;
   wherein the user interface is adapted for displaying the representations of status conditions of the physical device; and
   wherein the creating means is adapted for using the pointgroups to create the system database and the pointgroups allow a user to decrease the amount of time spent on creating points for the physical devices.

2. The user interface of claim 1 comprising a graphical symbol adapted to represent the physical device, wherein the creating means uses the graphical symbol to create a graphic file for controlling/monitoring the physical device, wherein the graphical symbol for the multi-parameter physical device is automatically linked to the points within the pointgroup upon linking of the symbol to the pointgroup.

3. The user interface of claim 2 wherein the symbol which represents the multi-parameter physical device has a set of logical parameters associated with the symbol, and wherein the creating means automatically links the logical parameters associated with the symbol to the appropriate points within the pointgroup upon linking the pointgroup to the symbol.

4. An automated monitoring/control system for monitoring and/or controlling a plurality of physical devices within a control structure, the system comprising;
   a system database which needs to be created by a user in order to include a set of graphical symbols to represent the physical devices within the control structure;
   a user interface for monitoring and controlling the physical devices within the control structure using the system database;
   means for coupling the physical devices to the user interface within the system;
   a set of points to be used within the system database, the points being adapted to represent the physical devices Within the control structure and adapted for accessibility from the user interface;
   a set of pointgroups, adapted to represent multi-parameter physical devices within the control structure and adapted for accessibility from the user interface, said muti-parameter physical devices automatically being linked to the points within the pointgroups upon linking of the symbols to the pointgroups, each pointgroup having at least one point linked to the pointgroup, and each point within a pointgroup representing one of the physical parameters of the multi-parameter physical device; and
   means for creating the system database through the use of the user interface with the use of pointgroups for the multi-parameter physical devices, the pointgroups allowing a user to decrease the amount of time spent on creating points for the physical devices.

5. The automated control/monitoring system of claim 4 comprising a set of graphical symbols that are adapted to represent the physical devices within the control structure, the means for creating the system database also using the set of graphical symbols to create graphic files for monitoring the physical devices, the graphical—symbols for the multi-parameter physical devices automatically being linked to the points within the pointgroup upon linking of the symbol to the pointgroup.

6. An automated monitoring/control system for monitoring and/or controlling physical devices within a control structure, the system comprising;
   a system database which needs to be created by a user in order to include a set of graphical symbols to represent the physical devices within the control structure
   a user interface for monitoring and controlling physical devices within the control structure using the system database;
   means for coupling the physical devices to the user interface within the system;
   a set of points to be used within the system database, the points being adapted to represent the physical devices within the control structure and adapted for accessibility from the user interface;
   a set of pointgroups, adapted to represent multi-parameter physical devices within the control structure and adapted for accessibility from the user interface, each pointgroup having at least one point linked to the pointgroup, and each point within a pointgroup representing one of the physical parameters of the multi-parameter physical device;
   means for creating the system database through the use of the user interface with the use of pointgroups for the multi-parameter physical devices, the pointgroups allowing a user to decrease the amount of time spent on creating points for the physical devices; and a set of graphical symbols adapted to represent the physical devices within the control structure, the means for creating the system database also using a pre-made set of graphical symbols to create graphic files for controlling/monitoring the physical devices, the graphical symbols for the multi-parameter physical devices automatically being linked to the points within the pointgroup upon linking of the symbols to the pointgroup.

7. The automated control/monitoring system of claim 6 wherein the symbols which represent the multi-parameter physical devices have a set of logical parameters associated with the symbols, and wherein the means for creating the system database also automatically links the logical parameters associated with the symbol to the appropriate points within the pointgroup upon linking the pointgroup to the symbol.

* * * * *